Figure 1:
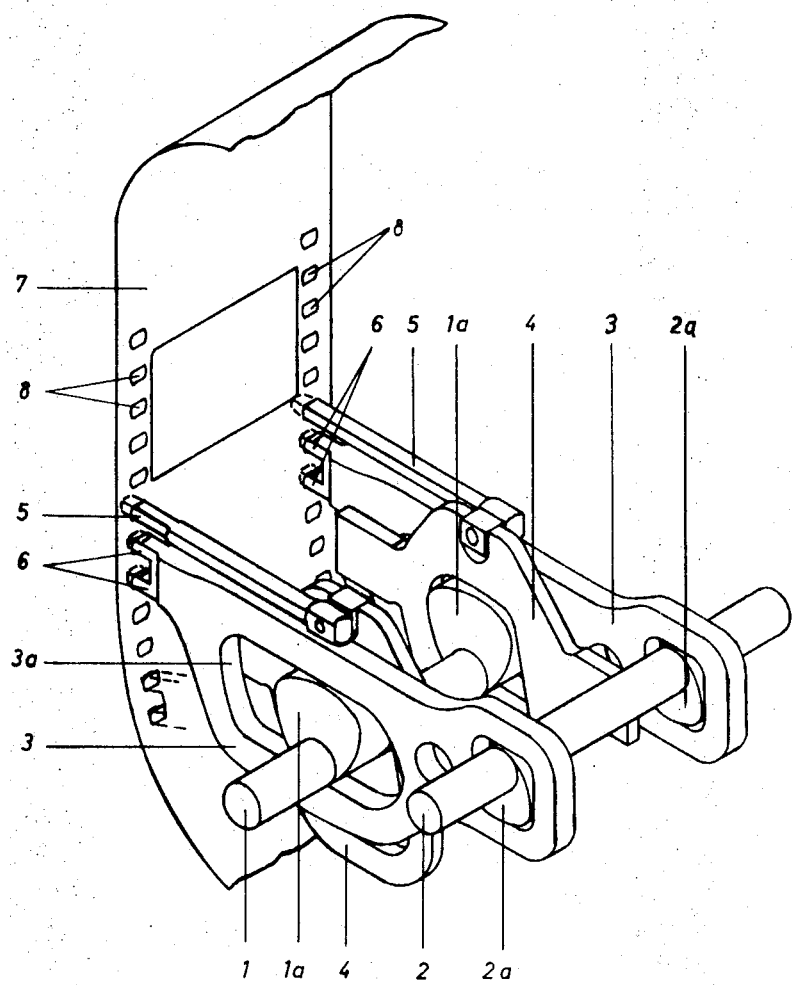

United States Patent

[11] 3,587,960

| [72] | Inventor | Joachim Gerb<br>Munich, Germany |
|---|---|---|
| [21] | Appl. No. | 727,389 |
| [22] | Filed | May 8, 1968 |
| [45] | Patented | June 28, 1971 |
| [73] | Assignee | Arnold & Richter KG<br>Munich, Germany |
| [32] | Priority | May 17, 1967 |
| [33] | | Germany |
| [31] | | A55,731 |

[54] FILM FEED MECHANISM
3 Claims, 2 Drawing Figs.

[52] U.S. Cl............................................... 226/62,
352/194
[51] Int. Cl....................................... G03b 1/22
[50] Field of Search............................................. 352/191,
194; 226/63, 62, 64

[56] References Cited
UNITED STATES PATENTS
2,136,930  11/1938  Albrecht ..................... 226/63
3,049,275  8/1962  Nuttall ....................... 226/63

Primary Examiner—Richard A. Schacher
Attorney—Fleit, Gipple & Jacobson

ABSTRACT: A film feed mechanism for intermittently advancing a strip of perforated film by a plurality of claws arranged in the perforation planes of the film. Each of the plurality of claws defines a plurality of cam slots, a plurality of heart cams are positioned in the cam slots and are mounted on a plurality of shafts. The claws are guided and driven by heart cams mounted on two shafts arranged one behind the other and driven in the same direction with the cams traveling in phase effect to insert the claws into the film perforations by moving the claws in their respective perforation planes in synchronous movement to engage the film simultaneously in the perforations on both sides of the film.

INVENTOR
JOACHIM GERB

INVENTOR
JOACHIM GERB

FILM FEED MECHANISM

The invention relates to a film feed mechanism in which the strip of film is intermittently advanced by at least one pulldown arranged in each of the two perforation planes and said pins are driven by a heart cam, which is mounted on a shaft, and a claw.

The known film feed mechanisms of the kind which has been described above have in the center plane between the two perforation planes a heart cam or a crank, from which a bridgelike claw extends, which carries at its ends the pulldown pins and any registration pins. Such claws have a large overhang and must be made of steel or other metallic materials because they are subjected to a complex loading by mass forces of steel or other metallic materials. For this reason, the claws have a considerable weight so that the inertia forces acting on the system particularly during high-speed operation are extremely high, and strong vibration and a very high wear are encountered and result in an inaccurate film feed.

Since the advent of sound recordings, it has been desired to reduce the noise which is emitted by the pulldown mechanism as a result of the above-mentioned conditions. This requirement has not been met, however, because it was believed that the components of the mechanism had to be made of steel or other metallic materials because they were subjected to a complex loading.

It is an object of the invention to overcome the vibration which is inherent in the known systems and the high wear which results from such vibration and gives rise to inaccuracies in the film feed.

To accomplish this object, the invention provides a film feed mechanism of the kind defined first hereinbefore, in which the shaft has a heart cam in each perforation plane and the pulldown pins are connected by respective claws to respective heart cams. This solution to the problem has not been obvious because the teaching of the invention calls for a doubling of the heart cams and of the claws and this seems to counteract the required reduction of the weight of the moved components of the film feed mechanism. On the other hand, the design suggested by the invention enables the use of claws consisting of lightweight materials, such as laminated fabrics. The doubling of the heart cams is not significant because they perform a rotational rather than oscillatory movement about the shaft. The moving masses are extremely small in spite of the fact that the components have been doubled. As pressures which are due to an acceleration of masses are small, e.g., at the professional speed of 24 or 25 pictures per minute, an extremely silent operation of the film feed mechanism is ensured so that the emission of sound is virtually insignificant even for sound recordings.

Owing to the extremely small reciprocating masses obtained by the teaching according to the invention, the stress on the claws, the mechanical loading of the reciprocating components and the resulting contact pressures between these components and the heart cams remain in tolerable limits even at 150 frames per second (=9,000 revolutions per minute).

In a particularly preferred embodiment of the invention, the claws are driven and guided by two shafts, which are arranged one behind the other and are driven uniformly and in the same direction and which are provided each with two heart cams, and heart cams of one shaft enter cam slots in respective claws. Whereas the heart cams of the rear shaft cause the claws to move the pins into the perforations, the cam slots of the claws ensure a parallel guidance during the entering operation.

It will be particularly desirable if the heart cams of different shafts are offset by 180° and all heart cams are movable towards the pivotal axis of the claws because this design ensures a feeding of the film at high speed. As the claws perform a fast forward stroke and the return stroke is performed at a low speed during the exposure time of the film, much light is received by the film.

Instead of heart cams, cranks or normal eccentrics can be used in the mechanism according to the invention.

Figure 2:
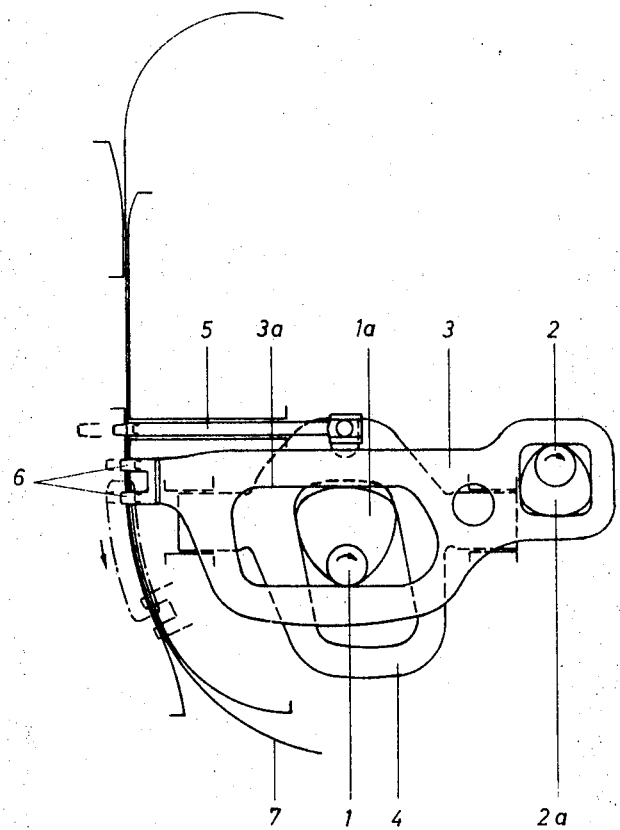

The invention will be described hereinafter with reference to an embodiment shown by way of example on the drawing, in which FIG. 1 is a perspective view showing the film feed mechanism according to the invention and FIG. 2 is a side elevation thereof.

Two shafts 1, 2 are provided each with heart cams and coupled to rotate in the same sense with a ratio of 1:1. The heart cams of each shaft lie in the same angular position. The angular positions of the heart cams of the two shafts 1, 2 are offset 180°.

The longitudinal direction of the two shafts 1, 2 is parallel to the plane of the film and at right angles to the direction of travel of the film. The right-hand and left-hand heart cams of the two shafts 1, 2 are respectively in the two perforation planes of the films.

The heart cams of the shaft 2 produce a smaller stroke and ensure a straight-line movement of the pulldown pins 6 of the claws 3 into and out of the perforation holes of the film. The heart cams of the shaft 1 produce a much larger stroke and during the forward stroke of the claws 3 have no effect on the claws but provide only a parallel guidance during the forward movement. As the heart cam shaft 1 continues its rotation, it effects the feed movement of the film.

When the feed stroke has been completed, the heart cam shaft 2 which caused the pins to enter the perforations now moves the pins 6 out of the perforations whereas the cams producing the larger stroke provide a parallel guidance.

The further rotary movements of the claw shafts retract the two claws 3 so that a new cycle can begin at the end of the return stroke.

Two cam plates 4 are provided on the inside of respective claws 3 and are also driven by the larger heart cams of the claw shaft 1. These cam plates 4 perform only a reciprocating motion and have intervals of rest at the ends of said movement. Each of said cam plates 4 drives a registration pin 5, which is disposed only in the associated perforation plane. One of the two pins 5 enters the perforation hole to provide for a lateral guidance of the film. The pins 5 are provided with slender cones so that they will effect a fine adjustment of the film position.

The pulldown mechanism according to the invention can be used within a large speed range, including a low-speed operation, a single frame operation, a speed of 24 or 25 frames per second, or a slow-motion operation at up to about 150 frames per second.

The film feed mechanism according to the invention may be operated in forward and reverse directions. In this arrangement the heart cam shafts 1, 2 produce angular steps of about 98° so that a reflex shutter operating at one-half their speed will have an angle of opening of 200°.

I claim:

1. A film feed mechanism in which a strip of perforated film is intermittently advanced by claws arranged in each of the film perforation planes, comprising a plurality of claws, each of said claws defining a plurality of cam slots, heart cams positioned in said cam slots and mounted on two shafts, said plurality of claws being guided and driven by said heart cams mounted on said two shafts, said shafts being arranged one behind the other and driven in the same direction, said driven heart cams traveling in phase effect to insert said claws into the film perforations with the claws moving in their respective perforation planes in synchronous movement so as to engage the film simultaneously in the perforations on both sides of the film.

2. A mechanism according to claim 1, characterized in that the heart cam on one shaft is offset 180° from the heart shaft cam on the other shaft and all heart cams are movable toward the pivotal axis of the claws.

3. A mechanism according to claim 1, wherein a cam plate carrying a registration pin is arranged on the inside of each claw and said plates are driven by the heart cams of the forward shaft.